(12) United States Patent
Nagata

(10) Patent No.: US 10,401,820 B2
(45) Date of Patent: Sep. 3, 2019

(54) PROGRAMMABLE INDICATOR

(71) Applicant: OMRON Corporation, Kyoto-shi, Kyoto (JP)

(72) Inventor: Yuta Nagata, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 778 days.

(21) Appl. No.: 14/746,900

(22) Filed: Jun. 23, 2015

(65) Prior Publication Data
US 2015/0378340 A1 Dec. 31, 2015

(30) Foreign Application Priority Data

Jun. 27, 2014 (JP) ................. 2014-132365

(51) Int. Cl.
*G05B 15/00* (2006.01)
*G05B 19/05* (2006.01)

(52) U.S. Cl.
CPC .. *G05B 19/058* (2013.01); *G05B 2219/14097* (2013.01)

(58) Field of Classification Search
CPC ............................ G05B 19/056; G05B 19/058
USPC ...................................................... 700/78, 83
See application file for complete search history.

(56) References Cited

U.S. PATENT DOCUMENTS

| | | | |
|---|---|---|---|
| 6,204,776 B1 | 3/2001 | Nomura | |
| 2007/0147201 A1* | 6/2007 | Nomura | G11B 27/034 369/47.14 |
| 2007/0168068 A1* | 7/2007 | Saito | G05B 19/042 700/109 |

FOREIGN PATENT DOCUMENTS

| | | |
|---|---|---|
| CN | 1930540 A | 3/2007 |
| CN | 1988025 A | 6/2007 |
| EP | 1734432 A1 | 12/2006 |
| JP | 2000-284822 A | 10/2000 |
| JP | 2002-157279 A | 5/2002 |
| JP | 2004-029904 A | 1/2004 |
| JP | 2011-118733 A | 6/2011 |
| JP | 2012-208931 A | 10/2012 |

(Continued)

OTHER PUBLICATIONS

Matri kon Inc.:"MatrikonOPC Explorer Userrs Manual",,Aug. 21, 2009(Aug. 21, 2009), pp. 1-81, XP055217389,Retrieved from the Internet:URL:http://home.hit.no/'hansha/documents/software/documents/MatrikonOPC%20Explorer%20Use%20Manual.pdf [retrieved on Sep. 30, 2015]*p. 5-p. 81*.

(Continued)

*Primary Examiner* — Mohammad Ali
*Assistant Examiner* — Sheela Rao
(74) *Attorney, Agent, or Firm* — Metrolex IP Law Group, PLLC

(57) ABSTRACT

One aspect of the present invention provides a programmable indicator, which can present information on a failure to the user with little delay when failing to periodically acquire data from a PLC. The programmable indicator includes a display screen, a communicator configured to communicate with the PLC, and a controller configured to control the display screen and the communicator. The controller acquires data from the PLC through the communicator in a predetermined period. When failing to acquire the data, the controller displays a name identifying the data and successful timing on the display screen, the successful timing being associated with successful acquisition of the latest data before the failure.

18 Claims, 14 Drawing Sheets

(56) References Cited

FOREIGN PATENT DOCUMENTS

JP    2013-222356 A    10/2013
WO    2014083646 A1    6/2014

OTHER PUBLICATIONS

Japanese office action letter dated Dec. 5, 2017 in a counterpart Japanese patent application.
Chinese office action letter dated Nov. 3, 2017 in a counterpart Chinese patent application.
Japanese Office Action (JPOA) dated Jul. 24, 2018 in the counterpart Japanese patent application.

* cited by examiner

PROGRAMMABLE INDICATOR

CROSS-REFERENCE TO RELATED APPLICATION

This application is based on Japanese Patent Application No. 2014-132365 filed with the Japan Patent Office on Jun. 27, 2014, the entire contents of which are incorporated herein by reference.

FIELD

The present invention relates to a programmable indicator.

BACKGROUND

Conventionally, there is well known a PLC system provided with a programmable indicator that is a PLC (Programmable Logic Controller) or a HMI (Human Machine Interface).

For example, JP 2012-208931 A discloses a configuration for a PLC system including a PLC that controls operation of a device and a personal computer that is a maintenance device connected to the PLC through a communication line to perform maintenance of the PLC.

The PLC includes an information storage unit in which information on an operating state of the PLC is stored, the information being directly recognizable by a user, and a PLC information storage unit. When a predetermined operating state of the PLC is detected, the PLC information storage unit stores PLC information corresponding to the operating state of the PLC in an abnormal generation information storage region from pieces of information stored in the information storage unit. The personal computer includes a PLC information acquisition unit that acquires the PLC information stored in the PLC information storage unit and an information display unit that displays the PLC information acquired from the PLC information acquisition unit.

In JP 2012-208931 A, "because a time lag is not generated between the operating state of the PLC and the information, the information acquired from the PLC side can directly be displayed on the maintenance device side" is described as an effect of the PLC system having the above configuration.

For example, JP 2013-222356 A discloses a human-machine screen display method for a plant monitoring control device. A display in which a plurality of screens are displayed and a camera that captures a facial image of a person facing the display are used in the human-machine screen display method.

A distance detection unit that detects a distance between the screen and the face of the person, a distance determination unit that compares the distance and a reference distance value, a feature detection unit that detects a feature of a facial expression of the person, and an expression determination unit that identifies the expression are provided in the camera. A screen display enlarging unit is provided in the display. The screen display enlarging unit enlarges one of the screens facing the person using signals of the distance determination unit and expression determination unit.

In JP 2013-222356 A, "in the case that the characters or graphics displayed on the screen is too small to distinguish from each other, the screen is automatically enlarged by such typical, natural operation and expression that the face is brought close to the screen to squinch eyes, so that monitoring control can smoothly be performed while focusing on an object to be monitored" is described as an effect of the human-machine screen display method having the above configuration.

For example, JP 2011-118733 A discloses a PLC including a higher-level PC and a station that communicates with the higher-level PC. The station includes a plurality of modules including a CPU module. The higher-level PC includes a station monitor. The station monitor acquires running state codes of the plurality of modules through the CPU module. In the case that an alarm is generated, the station monitor refers to an alarm message file corresponding to the running state code, and displays an acquired alarm message.

In JP 2011-118733 A, "because detailed running states of various modules constituting a unit can collectively be checked on the higher-level PC side, the running states can be monitored on the PC screen without directly checking the real machine" is described as an effect of the PLC having the above configuration.

However, in JP 2012-208931 A, JP 2013-222356 A, and JP 2011-118733 A, the programmable indicator can hardly output the situation of the latest communication with the PLC in real time. This point will be described below with a communication error in the communication situation as an example.

Usually communication error is pop-up displayed in the programmable indicator or the PC. The pop-up display is continued until the user performs confirmation operation (for example, selection of an OK button). Usually the pop-up display is displayed after a certain period of time elapses since the communication error is generated. Accordingly, the programmable indicator can hardly output the situation of the latest communication with the PLC in real time. In addition, conventionally, the communication error that is of a history expressing an abnormality is not stored.

SUMMARY

An object of the present invention is to provide a programmable indicator, which can present information on a failure to the user with little delay when failing to periodically acquire the data from the control device.

According to one aspect of the present invention, a programmable indicator is communicable with a control device that controls a device. The programmable indicator includes a display screen, a communication unit configured to communicate with the control device, and a control unit configured to control the display screen and the communication unit. The control unit acquires first data from the control device through the communication unit in a first period. When failing to acquire the first data, the control unit displays a name identifying the first data and first successful timing on the screen of the display screen, the first successful timing being associated with the successful acquisition of the latest first data before the failure.

Preferably the control unit acquires second data from the control device through the communication unit in a second period. When failing to acquire the second data, the control unit displays a name identifying the second data and second successful timing on the screen of the display screen, the second successful timing being associated with the successful acquisition of the latest second data before the failure.

Preferably, when failing to acquire the first data, the control unit displays first failure timing associated with the failure or elapsed time until the first failure timing since the first successful timing on the display screen.

Preferably the control unit displays time information corresponding to the first period while correlating the time information with the name identifying the first data.

Preferably the time information corresponding to the first period is a value of the first period retained as a setting value in the control unit or a time interval until next communication since communication associated with the acquisition of the first data measured by the control unit.

Preferably, when acquiring the first data, the control unit displays a value of the acquired data on the display screen.

Preferably the failure is non-existence of reception associated with the data acquisition, a fluctuation of a reception clock time beyond predetermined permissible time of the scheduled reception clock time, or detection of an error in the data acquired through the reception.

Preferably the control unit includes a storage unit in which a program is stored and a processing unit configured to execute the program. The first data is a value of the variable used in the program.

Preferably the name identifying the first data is a name of a variable.

Preferably the first successful timing is a clock time the reception associated with the acquisition of the first data is generated, the total number of reception times corresponding to the reception, or a first data generation or transmission clock time incorporated into the first data.

Preferably the failure timing is a clock time a determination of the non-existence of the reception associated with the data acquisition is made, a reception clock time the fluctuation is generated beyond the predetermined permissible time of the scheduled reception clock time, or a reception clock time the error is detected in the received data.

Preferably the first period is a period determined by the control unit or the communication unit.

Preferably the first period is a period determined by the control device.

The present invention can provide the programmable indicator, which can present the information on the failure to the user with little delay when failing to periodically acquire the data from the control device.

DETAILED DESCRIPTION

Figure 1:
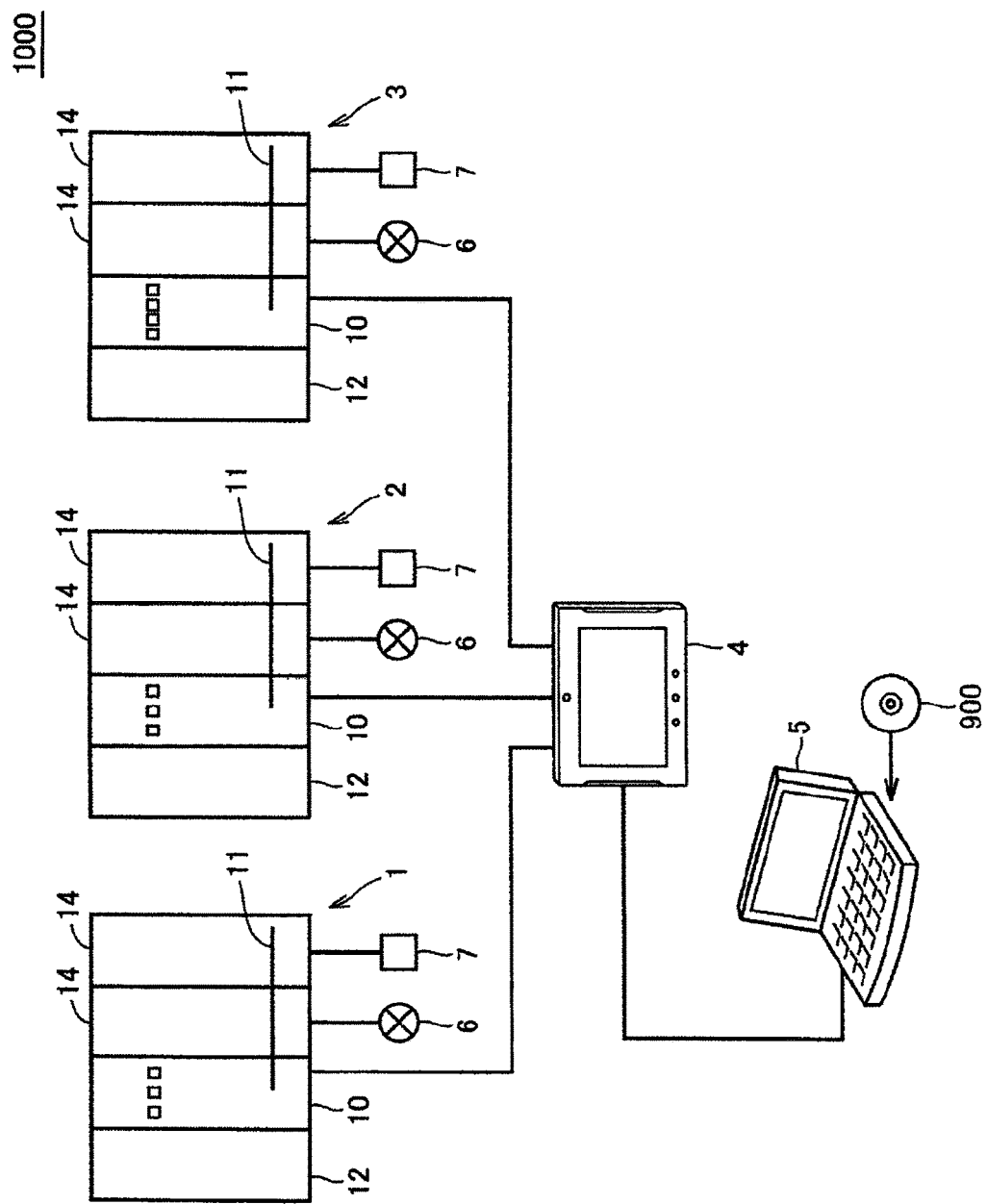
FIG. 1 is a schematic diagram illustrating a PLC system 1000 according to a first embodiment.

Hereinafter, an exemplary embodiment of the present invention will be described in detail with reference to the drawings. In the drawings, the identical or equivalent component is designated by the identical symbol, and the overlapping description is omitted.

First Embodiment

<A. System Configuration>

FIG. 1 is a schematic diagram illustrating a PLC system 1000 according to a first embodiment. Referring to FIG. 1, the PLC system 1000 includes a plurality of PLCs (PLC 1, PLC 2, and PLC 3), a programmable indicator 4, and a PC (Personal Computer) 5 that is of an external display device.

Typically, each of the PLCs 1 to 3 includes a CPU unit 10 that is a main body for executing a program, a power-supply unit 12 that supplies power to the CPU unit 10 and the like, and an IO (Input and Output) unit 14 that transmits and receives a signal to and from a field. The IO unit 14 is connected to the CPU unit 10 through a system bus 11. Typically, the IO unit 14 acquires an input signal from a detection sensor 6 that is a field device, and drives a relay 7 that is the field device according to a program execution result of the CPU unit 10.

The programmable indicator 4 acts as a GUI (Graphical User Interface) in an HMI (Human Machine Interface) environment. The programmable indicator 4 includes an operation unit such as a touch panel, a display such as a liquid crystal display, a communicator that communicates with the CPU unit 10, and a controller that controls each unit. In each of the PLCs 1 to 3, various settings can be changed in response to operation of the operation unit of the programmable indicator 4, and predetermined information on the PLC can be displayed on the programmable indicator 4.

The PC 5 is connected to the programmable indicator 4. The PC 5 has a function of monitoring running states of the PLCs 1 to 3 of connection targets and values of various pieces of data. In the case that the PC 5 acts as a support device, the PC 5 generates the program executed by the PLCs 1 to 3 and setting information. The PC 5 may have a debug function and a simulation function in order to support the generation of a program executable by a user.

In the first embodiment, by way of example, it is assumed that the PLCs 1 to 3 are connected to the programmable indicator 4 according to the following communication systems. The PLC 1 communicates with the programmable indicator 4 according to FINS (Factory Interface Network Service) communication. The PLC 2 communicates with the programmable indicator 4 according to HTTP (Hyper Text Transfer Protocol) communication. The PLC 3 communicates with the programmable indicator 4 according to EIP (EtherNet/IP) communication.

<B. Outline of Processing>

Figure 2:
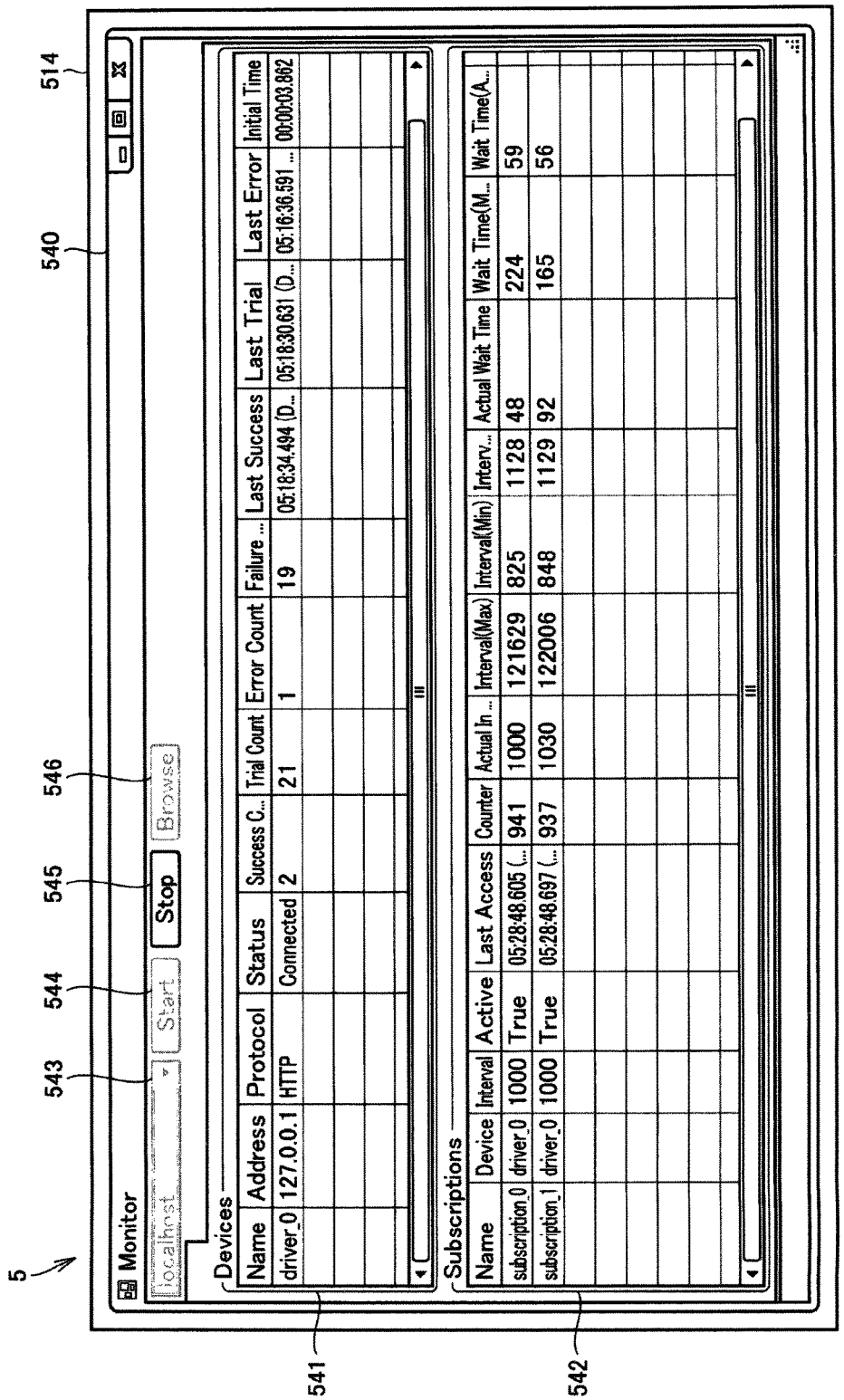
FIG. 2 is a view illustrating a content displayed by a PC 5.

FIG. 2 is a view illustrating a content displayed by the PC 5. Particularly, FIG. 2 is a view illustrating a screen displayed on a monitor 514 of the PC 5 in a certain aspect.

More particularly, FIG. 2 is a view illustrating a state in which data transmitted from the programmable indicator 4 is displayed on the PC 5.

Referring to FIG. 2, an object 543 designating a communication destination, an object 544 indicating start, an object 545 indicating stop, and an object 546 issuing an instruction to perform a browser function are displayed on a monitor 514 of the PC 5. FIG. 2 illustrates a screen 540 that is displayed at a certain clock time after the user selects the object 544.

When the object 544 is selected, the PC 5 receives data (hereinafter, referred to as "communication situation data D1") processed by the programmable indicator 4. Methods for generating and transmitting the communication situation data D1 in the programmable indicator 4 will be described in detail below.

The programmable indicator 4 communicates with the PLCs 1 to 3 in a designated period. The programmable indicator 4 stores a communication log every time the programmable indicator 4 communicates with the PLCs 1 to 3 in each period. Based on the newly-stored log, the programmable indicator 4 generates the communication situation data D1 expressing a situation of communication with the PLCs 1 to 3 using the newly-stored log. Particularly, based on the newly-stored log, the programmable indicator 4 generates the communication situation data D1 using the newly-stored log and the log stored in advance of the newly-stored log. Although described in detail later, the communication situation data D1 includes data (hereinafter, referred to as "statistical data D2") that is obtained by performing statistical processing on the newly-stored log and the log stored in advance of the newly-stored log. The detailed statistical data D2 is described later.

The programmable indicator 4 transmits the communication situation data D1 to the PC 5 based on the generation of the communication situation data D1. Particularly, the programmable indicator 4 transmits the communication situation data D1 to the PC 5 while the PLCs 1 to 3 can be distinguished from one another.

The detailed screen displayed on the monitor 514 will be described below. The PC 5 updates the screen displayed on the monitor 514 based on the communication situation data D1 sequentially transmitted from the programmable indicator 4 in real time. The screen 540 includes a display region 541 used to individually display data associated with a device (specifically, the PLCs 1 to 3) and a display region 542 used to display data associated with a subscription. The subscription is used to display a page on the programmable indicator 4. The detailed subscription is described later. Each of a plurality of pages that can be displayed on the programmable indicator 4 includes a region where a plurality of variables are displayed.

"Name", "Address", "Protocol", "Status", "Success Count", "Trial Count", "Error Count", "Failure Count", "Last Success", "Last Trial", "Last Error", and "Initial Time" are displayed in the display region 541 while correlated with one another.

"Name" is a name of the PLC with which the programmable indicator 4 communicates. "Address" expresses a communication destination address such as an IP address and an FINS address. "Protocol" expresses a kind of a communication protocol such as FINS, HTTP, and EIP. "Status" expresses one of successful communication (Connected), progress of connection processing (Connecting), and failed connection (waiting for a trial) (Idling). "Success Count" expresses the number of successful connection processing times. "Trial Count" expresses the number of connection processing performing times. "Error Count" expresses the number of communication error generation times after the successful connection processing. "Failure Count" expresses the number of failed connection processing times. "Last Success" expresses date and hour of the latest successful connection processing. "Last Trial" expresses date and hour of the latest performance of the connection processing. "Last Error" expresses date and hour of the latest generation of a communication error. "Initial Time" expresses time necessary for the connection processing.

"driver_0" in the field "Name" expresses the PLC 1. Values 2, 21, 1, and 19 in the fields "Success Count", "Trial Count", "Error Count", and "Failure Count" correspond to the statistical data D2 obtained through the statistical processing.

"Name", "device", "Interval", "Active", "Last Access", "Counter", "Actual Interval", "Interval (Max)", "Interval (Min)", "Interval (Ave)", "Actual Wait Time", "Wait Time (Max)", "Wait Time (Min)", and "Wait Time (Ave)" are displayed in the display region 542 while correlated with one another.

"Name" is a name of the subscription. "device" is a name of the PLC. "Interval" expresses a communication period (ideal value, designated period). "Active" expresses whether the communication is conducted. "Last Access" expresses time of the latest communication. "Counter" expresses the number of communication times. "Actual Interval" expresses an actual communication period. "Interval (Max)" expresses the actual communication period (statistical maximum value). "Interval (Min)" expresses the actual communication period (statistical minimum value). "Interval (Ave)" expresses the actual communication period (statistical average value). "Actual Wait Time" expresses communication waiting time (total time necessary for actual data read). "Wait Time (Max)" expresses the communication waiting time (statistical maximum value). "Wait Time (Min)" expresses the communication waiting time (statistical minimum value). "Wait Time (Ave)" expresses the communication waiting time (statistical average value).

The values in the fields "Counter", "Interval (Max)", "Interval (Min)", "Interval (Ave)", "Wait Time (Max)", "Wait Time (Min)", and "Wait Time (Ave)" correspond to the statistical data D2 obtained through the statistical processing.

Thus, the PC 5 displays the communication situation data D1 sequentially received from programmable indicator 4 on the monitor 514. The communication situation data D1 is generated using the latest communication log (final communication log). Accordingly, the user can check the latest situation of the communication with the PLCs 1 to 3 in real time.

As described above, the communication situation data D1 includes the statistical data D2 on which the statistical processing is performed. Accordingly, the user can recognize the communication situations of a plurality of times in the past in terms of a specific numerical value.

When the user selects the object 543, a list is displayed in order to select one of a plurality of communication destinations (USB, Ethernet (registered trademark) Hub, Ethernet Direct, and Local host (Simulator)). The user can check the screen based on the communication situation data D1 associated with the desired communication destination by selecting the one communication destination from the list. In the case that the user selects the Ethernet Hub, the PC 5 receives the designation of the IP. Alternatively, the PC 5 displays a list of programmable indicators using the browser function, and receives the programmable indicator selected from the list.

When the user selects the object 546, the PC 5 displays a list of programmable indicators included in the PLC system 1000. For the PLC system 1000 in FIG. 1, because only one programmable indicator is included in the PLC system 1000, the PC 5 displays only the programmable indicator 4.

<C. Functional Configuration>

Figure 3:
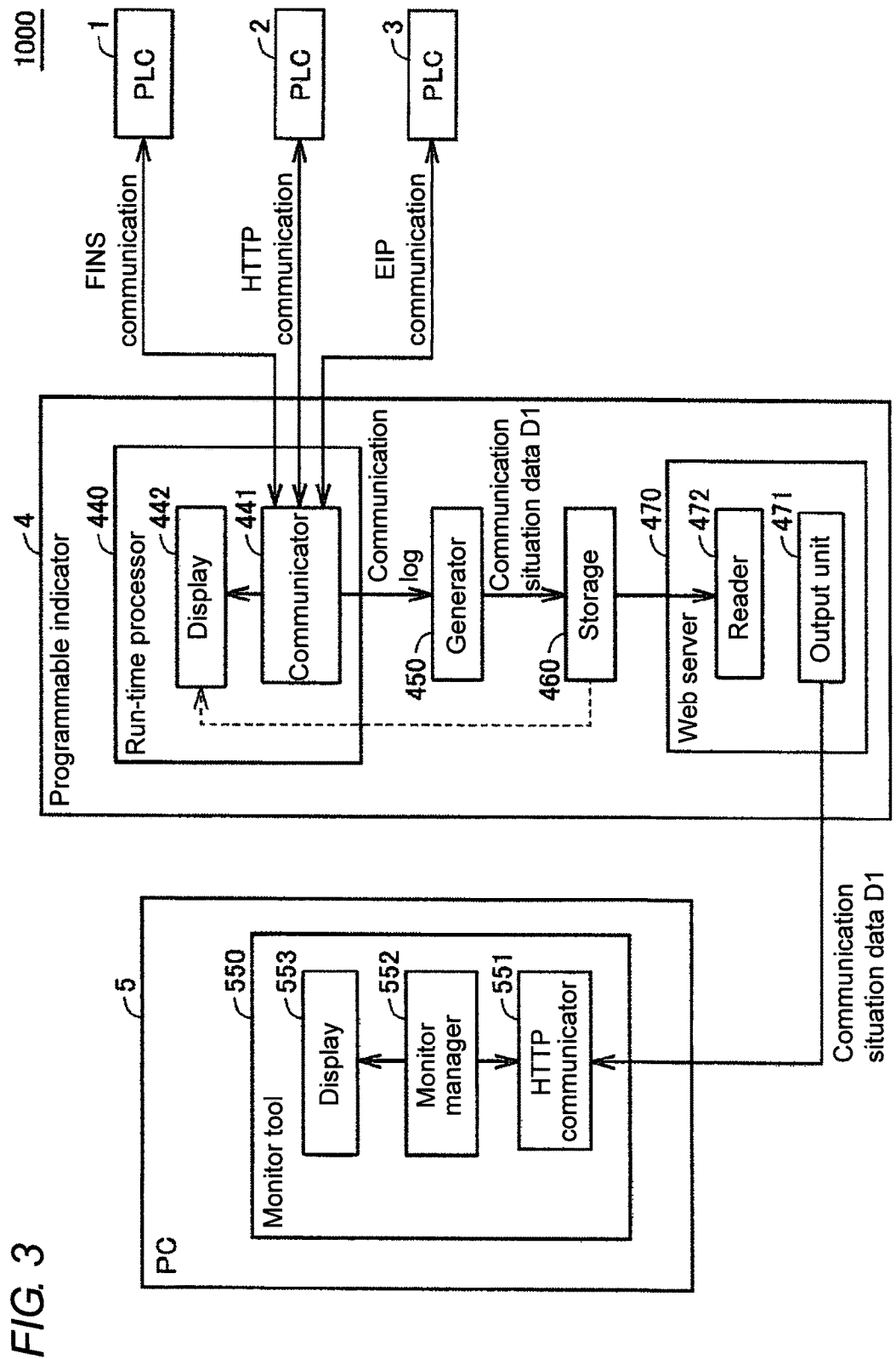
FIG. 3 is a functional block diagram illustrating functional configurations of a programmable indicator 4 and the PC 5.

FIG. 3 is a functional block diagram illustrating functional configurations of the programmable indicator 4 and PC 5. Referring to FIG. 3, the programmable indicator 4 includes a run-time processor 440, a generator 450, a storage 460, and a Web server 470. The run-time processor 440 includes a display 442 and a communicator 441. The PC 5 includes a monitor tool 550. The monitor tool 550 includes an HTTP communicator 551, a monitor manager 552, and a display 553.

The run-time processor 440 monitors the PLCs 1 to 3 and various devices connected to the PLCs 1 to 3, and collects pieces of data transmitted from various devices through the PLCs 1 to 3. The communicator 441 communicates with the PLC 1 according to the FIN. The communicator 441 communicates with the PLC 2 according to the HTTP. The communicator 441 communicates with the PLC 3 according to the EIP.

The communicator 441 communicates with each of the PLCs 1 to 3 in a designated period. For example, the communicator 441 communicates with the PLC 1 in a period of 500 msec with respect to a subscription 4411 (to be described later), and communicates with the PLC 2 in a period of 1000 msec with respect to a subscription 4412 (to be described later). The communicator 441 stores the log of the communication with each of the PLCs 1 to 3, and transmits the stored communication log to the generator 450.

The display 442 displays the page designated by the user in a plurality of pages. Unless the user designates the page, the display 442 displays a predetermined page. Each of the plurality of pages is generated based on at least one subscription.

Based on the reception of the log of the communication with the PLC from the communicator 441, the generator 450 generates the communication situation data D1 expressing the situation of the communication with the PLC using the communication log. That is, based on the newly-stored communication log, the generator 450 generates the communication situation data D1 expressing the situation of the communication with the corresponding PLC using the newly-stored communication log. More particularly, the generator 450 typically generates the communication situation data D1 using the plurality of communication logs that are obtained since the programmable indicator 4 is started.

The generator 450 stores the generated communication situation data D1 in the storage 460. Particularly, the generator 450 updates the communication situation data D1 stored in the storage 460 every time the communication situation data D1 is generated.

The Web server 470 conducts HTTP communication with the HTTP communicator 551 of the monitor tool 550 of the PC 5. When receiving a request command for acquiring the communication situation data D1 from the monitor tool 550, the Web server 470 reads the communication situation data D1 (sequentially-updated communication situation data) stored in the storage 460 in a predetermined period Tp using a reader 472. An output unit 471 transmits the communication situation data D1 read by the reader 472 to the HTTP communicator 551.

The monitor manager 552 of the PC 5 manages the monitoring of the programmable indicator 4. The detailed description is provided below. The monitor manager 552 receives an input operation from the user. For example, the monitor manager 552 receives an operation to select the objects 543 to 546 in FIG. 2 from the user through an operation unit (not illustrated, input device). The monitor manager 552 transmits a command corresponding to the selected object to the HTTP communicator 551. In the case that the object 544 is selected, the monitor manager 552 causes the HTTP communicator 551 to acquire the communication situation data D1 in the predetermined period Tp.

The monitor manager 552 causes the display 553 to display the communication situation data D1 acquired from the programmable indicator 4 in a predetermined display form (see FIG. 2). The monitor manager 552 updates the communication situation data D1 of the display target in each period Tp, thereby causing the display 553 to display the latest communication situation data D1.

Figure 4:
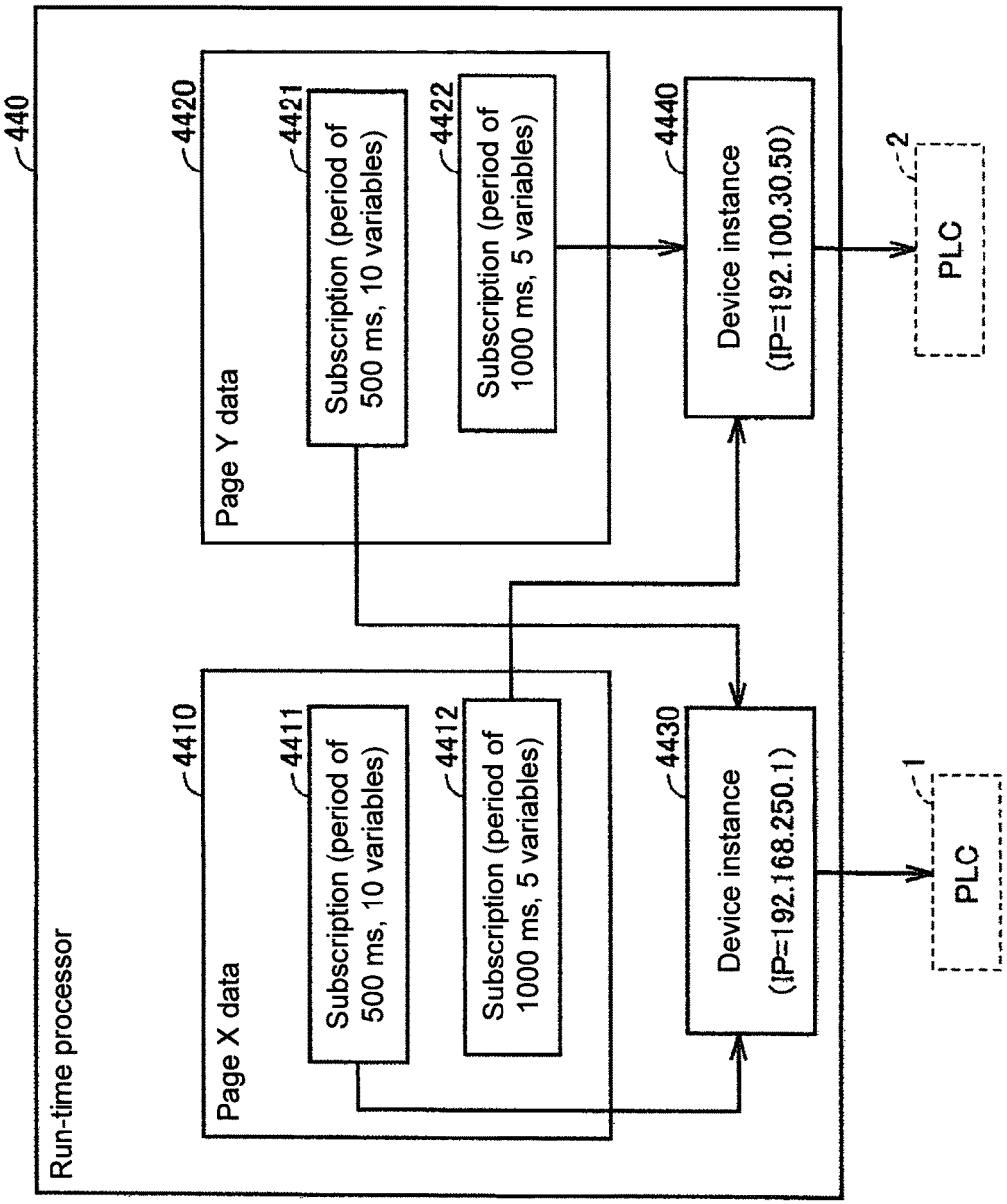
FIG. 4 is a view illustrating part of processing performed by a run-time processor 440 (see FIG. 3) of a programmable indicator 4.

FIG. 4 is a view illustrating part of processing performed by a run-time processor 440 (see FIG. 3) of a programmable indicator 4. Particularly, FIG. 4 is a view illustrating the subscription.

The run-time processor 440 includes data used to display the page with respect to each of the plurality of pages. Referring to FIG. 4, by way of example, the run-time processor 440 includes page X data 4410 used to display a page X and page Y data 4420 used to display a page Y. The run-time processor 440 also includes a PLC 1 device instance 4430, a PLC 2 device instance 4440, and a PLC 3 device instance (not illustrated).

The page X data 4410 includes the subscription 4411 and the subscription 4412. By way of example, 10 variables are defined in the subscription 4411. When the subscription 4411 is performed, the communicator 441 of the run-time processor 440 acquires the 10 variables from the PLC 1 through the device instance 4430 in the period of 500 msec. By way of example, 5 variables different from the 10 variables are defined in the subscription 4412. When the subscription 4412 is performed, the communicator 441 of the run-time processor 440 acquires the 5 variables from the PLC 2 through the device instance 4440 in the period of 1000 msec.

The reason the subscription 4411 and 4412 are provided to display the page X is that the period during which the variable is acquired is previously set in each variable.

The page Y data 4420 includes a subscription 4421 and a subscription 4422. By way of example, 10 variables are defined in the subscription 4421. When the subscription 4421 is performed, the communicator 441 of the run-time processor 440 acquires the 10 variables from the PLC 1 through the device instance 4430 in the period of 500 msec. By way of example, 5 variables different from the 10 variables defined in the subscription 4421 are defined in the subscription 4422. When the subscription 4422 is performed, the communicator 441 of the run-time processor 440 acquires the 5 variables from the PLC 2 through the device instance 4440 in the period of 1000 msec.

When the page X is displayed while the page Y is not displayed, the programmable indicator 4 performs the subscriptions 4411 and 4412 while not performing the subscriptions 4421 and 4422.

In the case that the page X is displayed, the communication situation data D1 includes data (a value of "Active" is "True") indicating that the communication is currently conducted to acquire the variable included in the page X (the subscriptions 4411 and 4412 are performed). In other words, in the case that the page X is displayed, the communication situation data D1 includes data (the value of "Active" is "False") indicating that the communication is not conducted to acquire the variable included in the page Y (the subscriptions 4421 and 4422 are not performed).

Referring to FIG. 2, for example, "subscription_0" in the display region 542 corresponds to the subscription 4412, and "subscription_1" corresponds to the subscription 4422. The user can instantaneously determine which one of the subscriptions is currently performed by checking the screen 540 (see FIG. 2) of the monitor 514 of the PC 5. Particularly, the user can instantaneously determine which one of the subscriptions is currently performed by checking the value ("True" or "False") of "Active" in each subscription. For example, in the case of FIG. 2, the user can recognize that "subscription_0" and "subscription_1" are performed.

The detailed pieces of processing performed by the communicator 441 and output unit 471 will be described below while divided into three patterns.

(1) It is said that the communicator 441 and the output unit 471 (FIG. 2) have the following configuration when attention is paid to the subscriptions 4411 and 4412 (subscriptions 4421 and 4422).

The communicator 441 communicates with the PLC 1 in a first period (500 msec) that is the designated period in order to acquire a first variable in the plurality of variables, and communicates with the PLC 2 in a second period (1000 msec) that is the designated period in order to acquire a second variable in the plurality of variables. The output unit 471 transmits the communication situation data D1, which is generated based on the communication conducted in the first period, and the communication situation data D1, which is generated based on the communication conducted in the second period, to the PC 5 while the pieces of communication situation data D1 can be distinguished from each other.

(2) It is said that the communicator 441 and the output unit 471 (FIG. 2) have the following configuration when attention is paid to the subscriptions 4411 and 4421.

In the case that the page X in the plurality of pages is displayed, the communicator 441 communicates with the PLC 1 in the first period (500 msec) that is the designated period in order to acquire a variable included in the page X.

In the case that the page Y in the plurality of pages is displayed, the communicator 441 communicates with the PLC 1 in the first period (500 msec) in order to acquire a variable included in the page Y. The output unit 471 transmits the communication situation data D1, which is generated based on the communication conducted to acquire the variable included in the page X, and the communication situation data D1, which is generated based on the communication conducted to acquire the variable included in the page Y, to the PC 5 while the pieces of communication situation data D1 can be distinguished from each other.

(3) It is said that the communicator 441 and the output unit 471 (FIG. 2) have the following configuration when attention is paid to the subscriptions 4411 and 4422.

In the case that the page X in the plurality of pages is displayed, the 441 communicates with the PLC 1 in the first period (500 msec) that is the designated period in order to acquire a variable included in the page X. In the case that the page Y in the plurality of pages is displayed, the communicator 441 communicates with the PLC 2 in the second period (1000 msec) in order to acquire the variable included in the page Y. The output unit 471 transmits the communication situation data D1, which is generated based on the communication conducted to acquire the variable included in the page X, and the communication situation data D1, which is generated based on the communication conducted to acquire the variable included in the page Y, to the PC 5 while the pieces of communication situation data D1 can be distinguished from each other.

<D. Control Structure>

Figure 5:
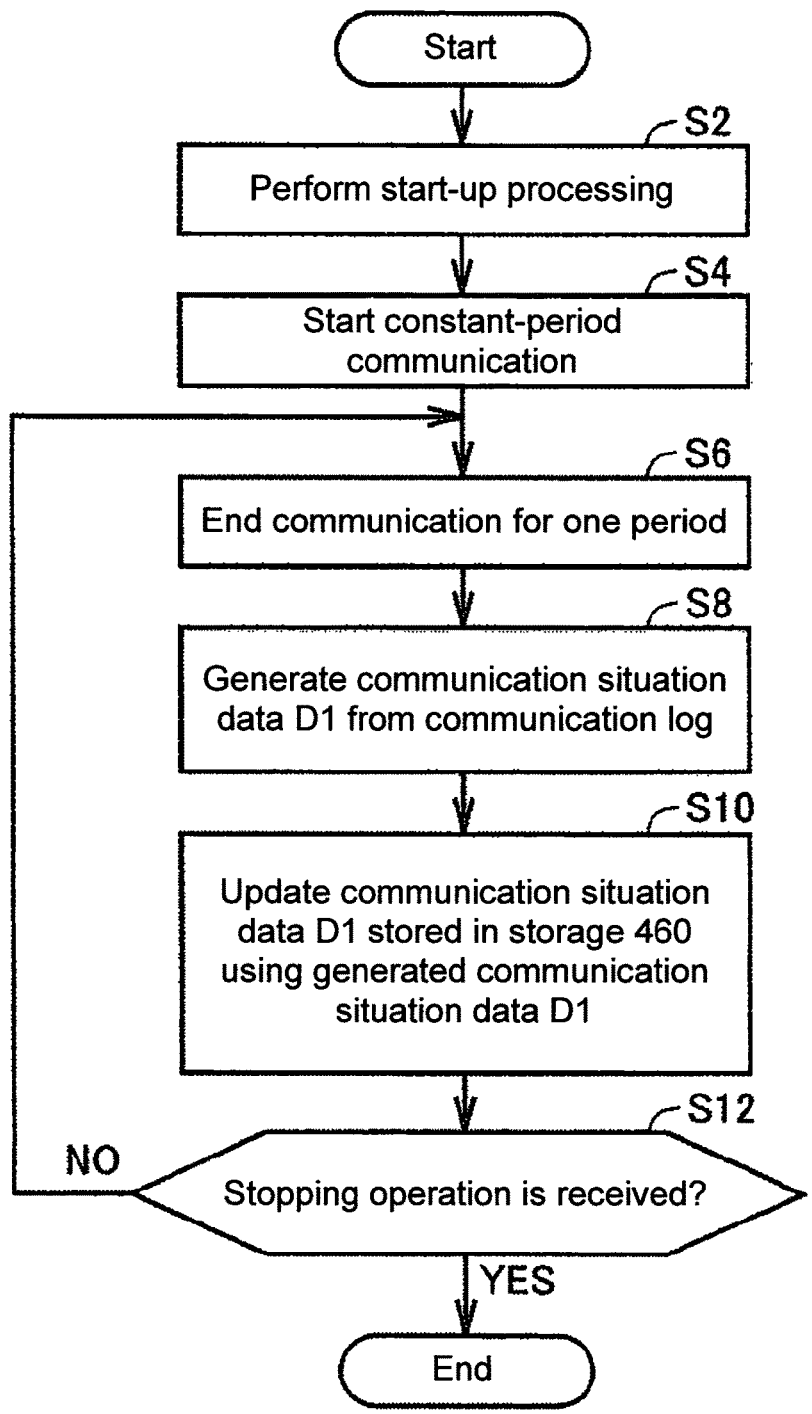
FIG. 5 is a flowchart illustrating a processing flow of the programmable indicator 4.

FIG. 5 is a flowchart illustrating a processing flow of the programmable indicator 4. Referring to FIG. 5, in Step S2, the programmable indicator 4 starts start-up processing when receiving a predetermined operation from the user. In Step S4, the programmable indicator 4 starts constant-period communication. For example, in the case that the page X is displayed, the programmable indicator 4 starts the communication with the PLC 2 in the period of 1000 msec by performing the subscription 4412 while starting the communication with the PLC 1 in the period of 500 msec by performing the subscription 4411.

When the communication for one period is ended in Step S6, the programmable indicator 4 generates the communication situation data D1 from the communication log in Step S8. In Step S10, the programmable indicator 4 updates the communication situation data D1 stored in the storage 460 using the generated communication situation data D1.

In Step S12, the programmable indicator 4 determines whether a stopping operation is received from the user. When determining that the stopping operation is received (YES in Step S12), the programmable indicator 4 ends a sequence of pieces of processing. When determining that the stopping operation is not received (NO in Step S12), the programmable indicator 4 progresses the processing to Step S6.

Figure 6:
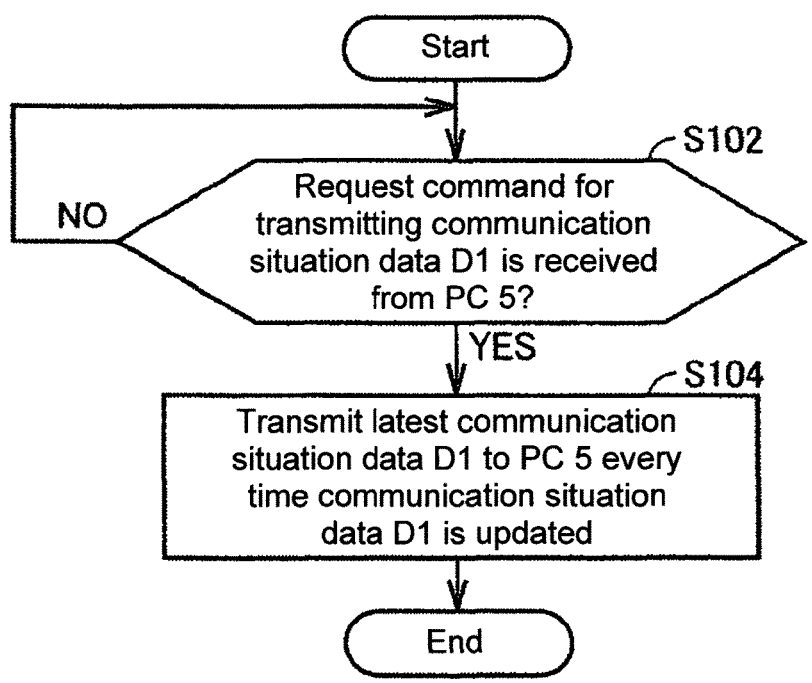
FIG. 6 is a flowchart illustrating another processing flow of the programmable indicator 4.

FIG. 6 is a flowchart illustrating another processing flow of the programmable indicator 4. Referring to FIG. 6, in Step S102, the programmable indicator 4 determines whether a request command for transmitting the communication situation data D1 is received from the PC 5. The programmable indicator 4 performs the processing in Step S102 at predetermined timing. For example, the programmable indicator 4 performs the processing in Step S102 with the end of the processing in Step S10 as a trigger.

When determining that the request command is received (YES in Step S102), the programmable indicator 4 transmits the latest communication situation data D1 to the PC5 every time the communication situation data D1 is updated in Step S104. When determining that the request command is not received (NO in Step S102), the programmable indicator 4 returns the processing to Step S102.

Figure 7:
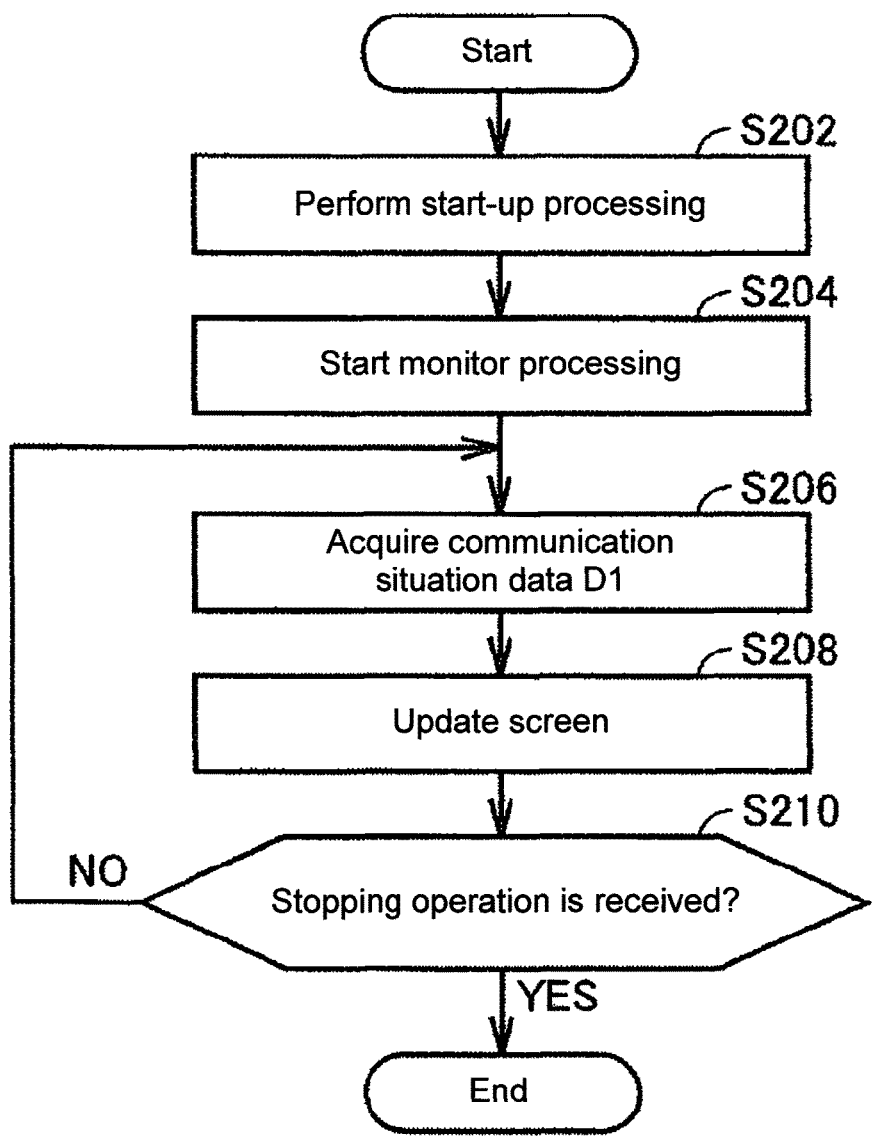
FIG. 7 is a flowchart illustrating a processing flow of the PC 5.

FIG. 7 is a flowchart illustrating a processing flow of the PC 5. Referring to FIG. 7, in Step S202, the PC 5 starts the start-up processing when receiving the predetermined operation from the user. In Step S204, the PC 5 starts the monitor processing using the monitor manager 552. In Step S206, the PC 5 acquires (receives) the communication situation data D1 from the programmable indicator 4.

In Step S208, the PC 5 updates the screen of the monitor 514 based on the latest communication situation data D1. In Step S210, the PC 5 determines whether the stopping operation is received from the user. When determining that the stopping operation is received (YES in Step S210), the PC 5 ends a sequence of pieces of processing. When determining that the stopping operation is not received (NO in Step S210), the PC 5 progresses the processing to Step S206.

<E. Hardware Configuration>
(e1. Programmable indicator 4)

Figure 8:
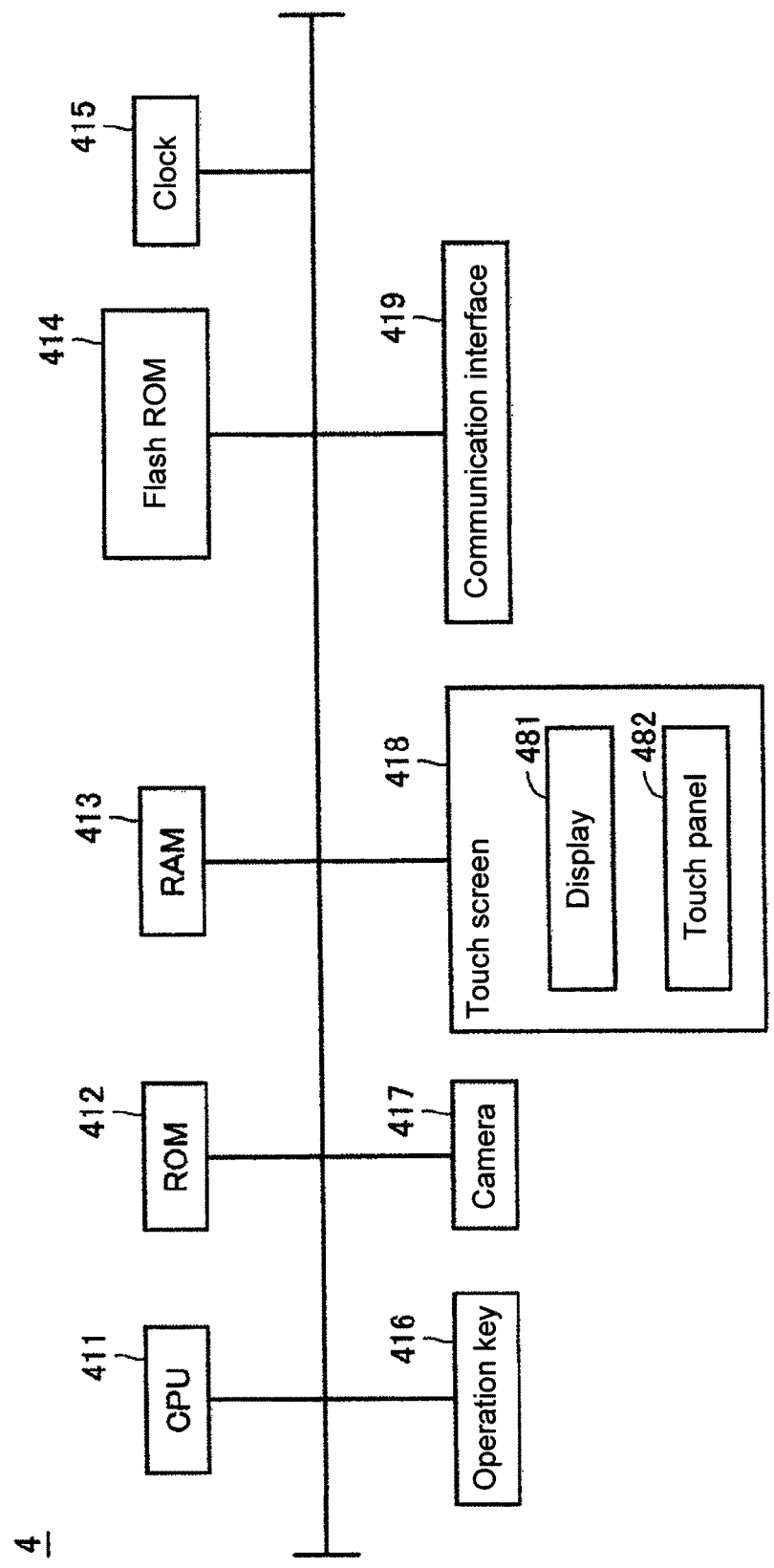
FIG. 8 is a view illustrating an example of a hardware configuration of the programmable indicator 4.

FIG. 8 is a view illustrating an example of a hardware configuration of the programmable indicator 4. Referring to FIG. 8, the programmable indicator 4 includes a CPU (Central Processing Unit) 411 that performs various calculations, a ROM (Read Only Memory) 412, a RAM (Random Access Memory) 413, a flash ROM 414 in which various programs are stored in a non-volatile manner, a clock 415, an operation key 416, a camera 417, a touch screen 418, and a communication interface 419. These units are connected to one another through an internal bus.

The touch screen 418 includes a display 481 and a touch panel 482 that is installed so as to cover the display 481.

The communication interface 419 includes various communication interfaces such as an Ethernet IF (InterFace), a serial IF, and a USB (Universal Serial Bus) IF. The programmable indicator 4 communicates with various electronic devices such as the PLCs 1 to 3 and the PC 5 through the communication interface 419.

The CPU 411 executes a program stored in the flash ROM 414 while expanding the program in the RAM 413. Generally, a program such as an Operating System (OS) is stored in the ROM 412. The RAM 413 is a volatile memory used as a work memory.

FIG. 8 illustrates general components constituting the programmable indicator 4. Accordingly, it is also said that a component necessary for the present invention is software stored in the memory such as the flash ROM 414 or software that can be downloaded through a network. Because action of each piece of hardware of the programmable indicator 4 is well known, the detailed description is not repeated.

(e2. PC5)

Figure 9:
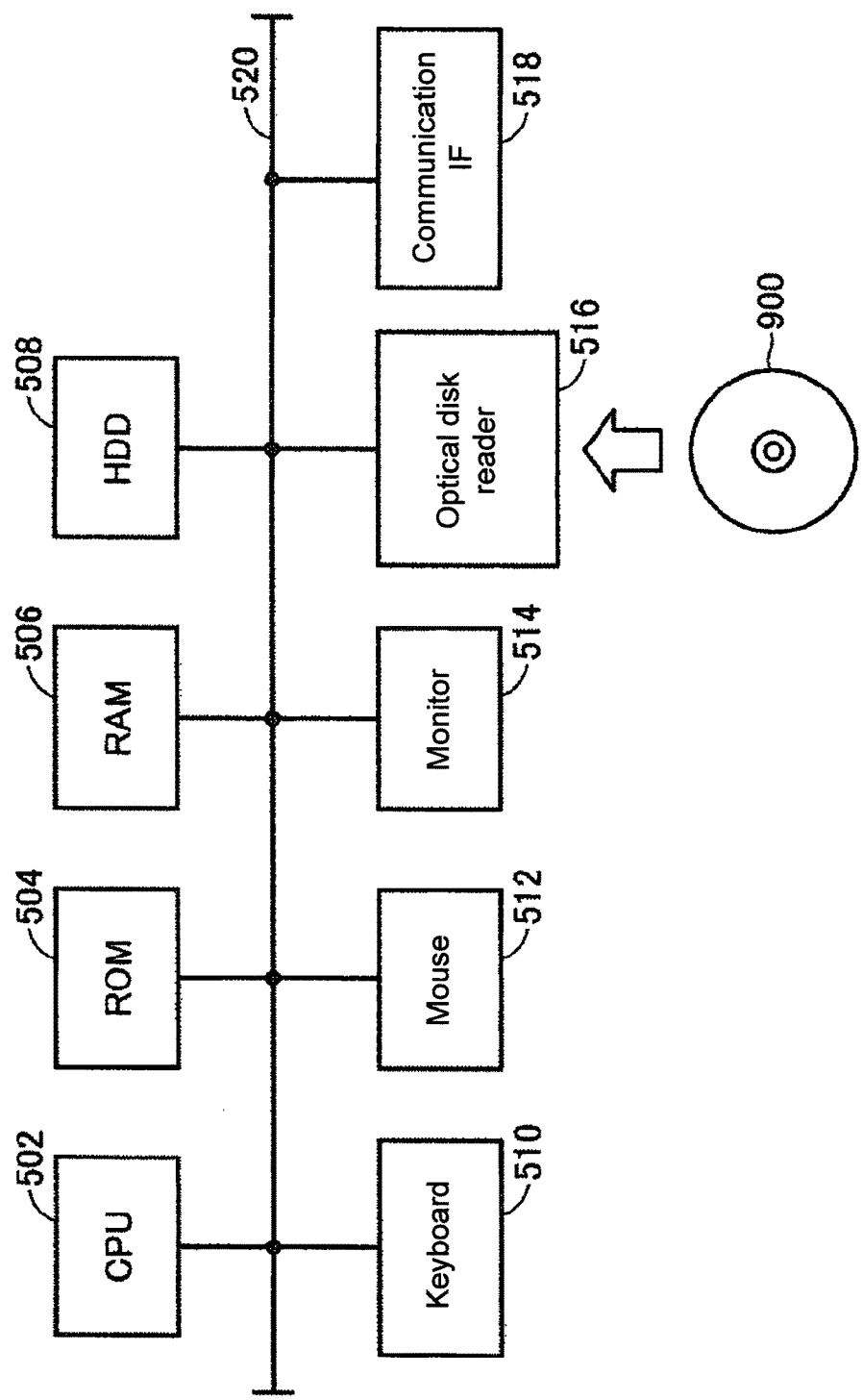
FIG. 9 is a schematic diagram illustrating a hardware configuration of the PC 5.

FIG. 9 is a schematic diagram illustrating a hardware configuration of the PC 5. Referring to FIG. 9, the PC 5 includes CPU 502 that executes various programs including the OS, a ROM (Read Only Memory) 504 in which BIOS and various pieces of data are stored, a memory RAM 506 that provides a work area where data necessary for the program executed by the CPU 502 is stored, and a hard disk (HDD) 508 in which the program executed by the CPU 502 is stored in a non-volatile manner.

The PC 5 also includes a keyboard 510 that receives the operation from the user, a mouse 512, and a monitor 514 that provides information to the user. The PC 5 also includes a communication interface (IF) 518 that communicates with the programmable indicator 4. The PC 5 is communicably connected to the programmable indicator 4 by the communication IF 518.

(e3. CPU units 10 of PLCs 1 to 3)

Figure 10:
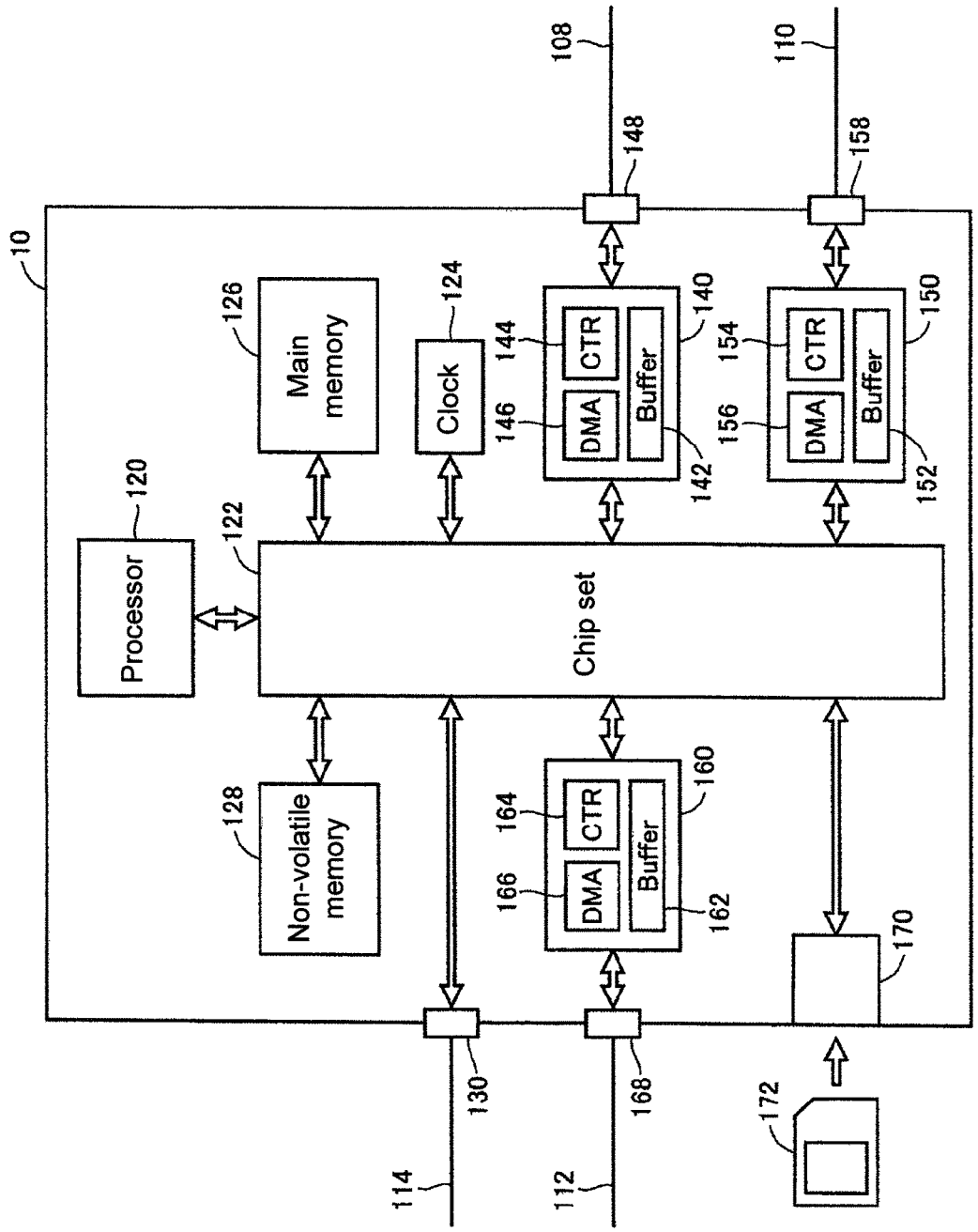
FIG. 10 is a view illustrating a hardware configuration of a CPU unit 10 in each of PLCs 1 to 3.

FIG. 10 is a view illustrating a hardware configuration of the CPU unit 10 in each of the PLCs 1 to 3. Referring to FIG. 10, the CPU unit 10 includes a processor 120, a chip set 122, a system clock 124, a main memory 126, a non-volatile memory 128, an Ethernet connector 130, a PLC system bus controller 140, a field bus controller 150, a higher-level communication controller 160, a memory card interface 170, and a USB connector (not illustrated). The chip set 122 and other components are connected to one another through various buses.

Typically, the processor 120 and the chip set 122 are configured according to a general-purpose computer architecture. That is, the processor 120 interprets and performs a command code sequentially supplied from the chip set 122 according to an internal clock. The chip set 122 transmits and receives internal data to and from various connected components, and generates the command code necessary for the processor 120. The system clock 124 generates a system clock having a predetermined period, and provides the system clock to the processor 120. The chip set 122 has a function of caching data obtained through calculation processing performed by the processor 120.

The CPU unit 10 includes the main memory 126 and the non-volatile memory 128 as the storage unit. The main memory 126 is a volatile storage area, various programs that should be executed by the processor 120 is retained in the main memory 126, and the main memory 126 is also used as a work memory during the execution of various programs. For example, the OS (Operating System), a system program, a user program, and log information are stored in the non-volatile memory 128 in a non-volatile manner.

The Ethernet connector 130 is an interface that connects the programmable indicator 4 and the CPU unit 10. The USB connector (not illustrated) is an interface that connects the support device and the CPU unit 10. Typically, an executable program transferred from the support device is captured in the CPU unit 10 through the USB connector.

The CPU unit 10 includes the PLC system bus controller 140, the field bus controller 150, and the higher-level communication controller 160 as the communication unit. These communication circuits transmit and receive data.

The PLC system bus controller 140 controls the transmission and reception of the data through a PLC system bus 108. More specifically, the PLC system bus controller 140 includes a buffer memory 142, a PLC system bus control circuit 144, and a DMA (Dynamic Memory Access) control circuit 146. The PLC system bus controller 140 is connected to the PLC system bus 108 through a PLC system bus connector 148.

The field bus controller 150 includes a buffer memory 152, a field bus control circuit 154, and a DMA control circuit 156. The field bus controller 150 is connected to a field bus 110 through a field bus connector 158. The higher-level communication controller 160 includes a buffer memory 162, a higher-level communication control circuit 164, and a DMA control circuit 166. The higher-level communication controller 160 is connected to a network 112 through a higher-level communication connector 168.

The memory card interface 170 connects a memory card 172 that can detachably be attached to the CPU unit 10 and the processor 120.

<F. Processing Performed by CPU>

The processing in the programmable indicator 4 will be described below while attention is paid to the CPU 411 (control unit) and the communication interface 419 (communication unit).

The programmable indicator 4 includes the display screen 540, the communication interface 419 (communication unit) that communicates with the PLCs 1, 2, and 3, and the CPU 411 (control unit) that controls the display screen 540 and the communication interface 419. The CPU 411 acquires the first data from the PLCs 1, 2, and 3 through the communication interface 419 in the first period. When failing to acquire the first data, the CPU 411 displays a name identifying the first data and first successful timing on the display screen of the display 481. The first successful timing is associated with the successful acquisition of the latest first data before the failure. In this configuration, the programmable indicator 4 can present information on the failure to the user with little delay when failing to periodically acquire the data from the PLCs 1, 2, and 3.

Time information corresponding to the first period is a value of the first period retained as the setting value in the CPU 411 or a time interval until the next communication since the communication associated with the acquisition of the first data measured by the CPU 411. The first period may be a period determined by the CPU 411 or the communication interface 419, or a period determined by the PLCs 1, 2, and 3.

The CPU 411 further obtains the second data from the PLCs 1, 2, and 3 through the communication interface 419 in the second period. When failing to acquire the second data, the CPU 411 displays a name identifying the second data and second successful timing on the display screen of the display 481. The second successful timing is associated with the successful acquisition of the latest second data before the failure.

When failing to acquire the first data, the CPU 411 displays failure timing associated with the failure or elapsed time until the failure timing since the first successful timing on the display screen of the display 481. The CPU 411 further displays the time information while correlating the time information with the name identifying the first data. When acquiring the first data, the CPU 411 displays the value of the acquired data on the display screen.

The failure is non-existence of the reception associated with the data acquisition, a fluctuation of a reception clock time beyond predetermined permissible time of the scheduled reception clock time, and the detection of an error in the data acquired through the reception.

Particularly, the first successful timing is a clock time the reception associated with the acquisition of the first data is generated, the total number of reception times corresponding to the reception, or a first data generation or transmission clock time incorporated into the first data. The failure timing is a clock time a determination of the non-existence of the reception associated with the data acquisition is made, a reception clock time the fluctuation is generated beyond the predetermined permissible time of the scheduled reception clock time, and a reception clock time the error is detected in the received data.

As described above, the programmable indicator 4 includes the storage 460 in which the program is stored and the run-time processor 440 that executes the program. The first data is a value of the variable used in the program. The name identifying the first data is a name of the variable.

Second Embodiment

In a configuration of a second embodiment, the PC simulates the processing in the PLC 2, and emulates the processing in the run-time processor 440 of the programmable indicator 4. Particularly, in the configuration of the second embodiment, the PC generates and displays the communication situation data D1.

Figure 11:
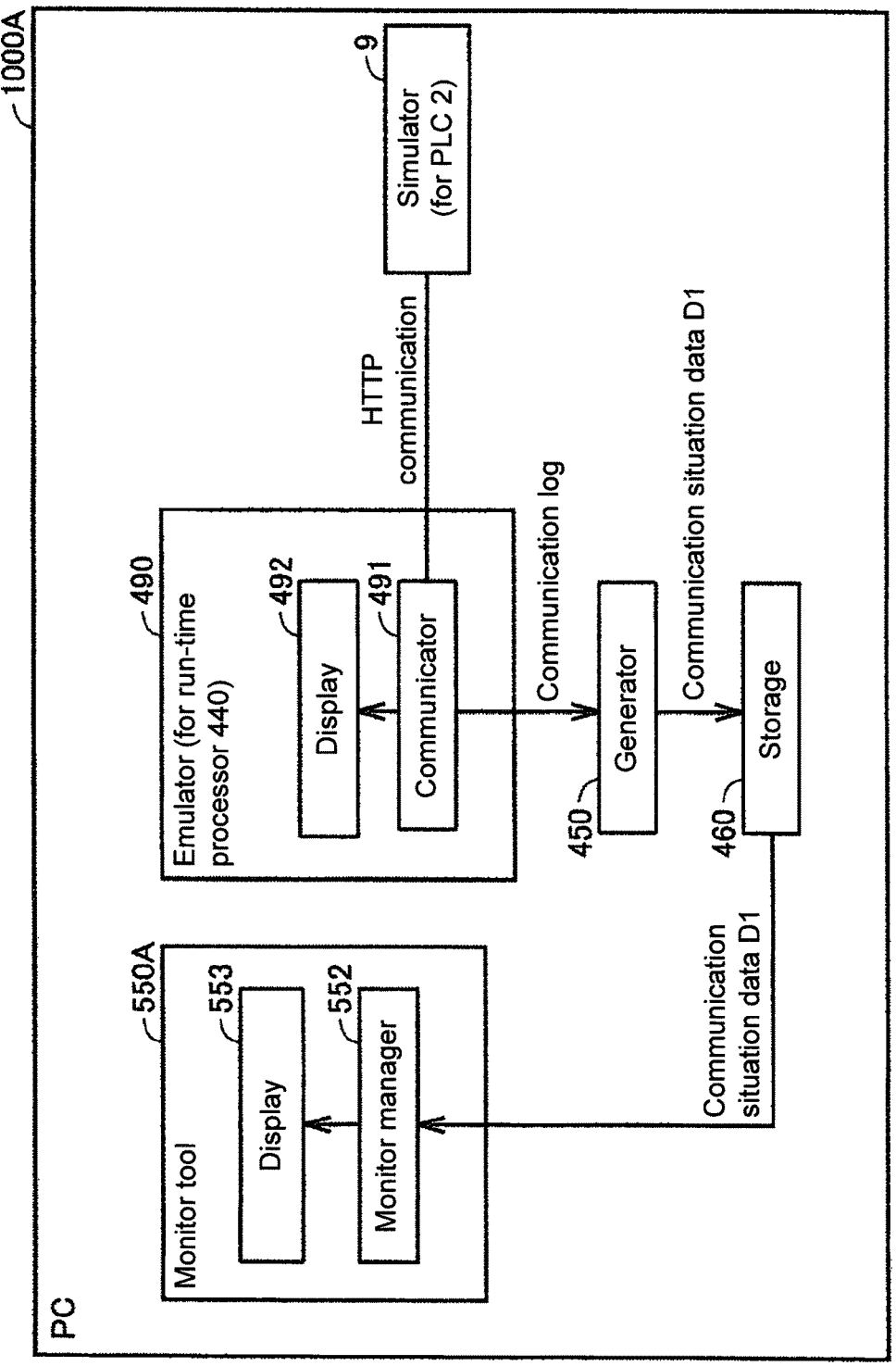
FIG. 11 is a view illustrating a functional configuration of a PC 1000A according to a second embodiment.

FIG. 11 is a view illustrating a functional configuration of a PC 1000A of the second embodiment. Referring to FIG. 11, the PC 1000A includes a monitor tool 550A, an emulator 490, a simulator 9, the generator 450, and the storage 460. The monitor tool 550A includes a monitor manager 552 and a display 553. The emulator 490 includes a communicator 491 and a display 492.

The simulator 9 simulates the processing in the PLC 2. The emulator 490 emulates the processing in the run-time processor 440 of the programmable indicator 4 of the first embodiment.

The communicator 491 of the emulator 490 communicates with the simulator 9 according to the HTTP.

The communicator 491 communicates with the PLC 2 in a designated period. The communicator 491 stores the log of the communication with the PLC 2, and transmits the stored communication log to the generator 450.

The display 492 displays the page designated by the user in a plurality of pages. Unless the user designates the page, the display 442 displays a predetermined page.

The monitor manager 552 sequentially reads the communication situation data D1 stored in the storage 460, and causes the display 553 to display the communication situation data D1 in a predetermined display form (see FIG. 2). The monitor manager 552 updates the communication situation data D1 of the display target in each period Tp, thereby causing the display 553 to display the latest communication situation data D1.

An effect similar to that of the first embodiment can be obtained in the PC 1000A having the above configuration. That is, the user can check the latest situation of the communication with the PLC 2 in real time. Additionally, the user can recognize the communication situations of the plurality of times in the past in terms of a specific numerical value.

By way of example, FIG. 11 illustrates a configuration in which the processing in the PLC 2 is simulated. Alternatively, the pieces of processing in the PLCs 1 and 3 may further be simulated.

Third Embodiment

In a third embodiment, the configuration of the PC 5 of the first embodiment is changed such that the simulation and emulation of the second embodiment can be performed.

Figure 12:
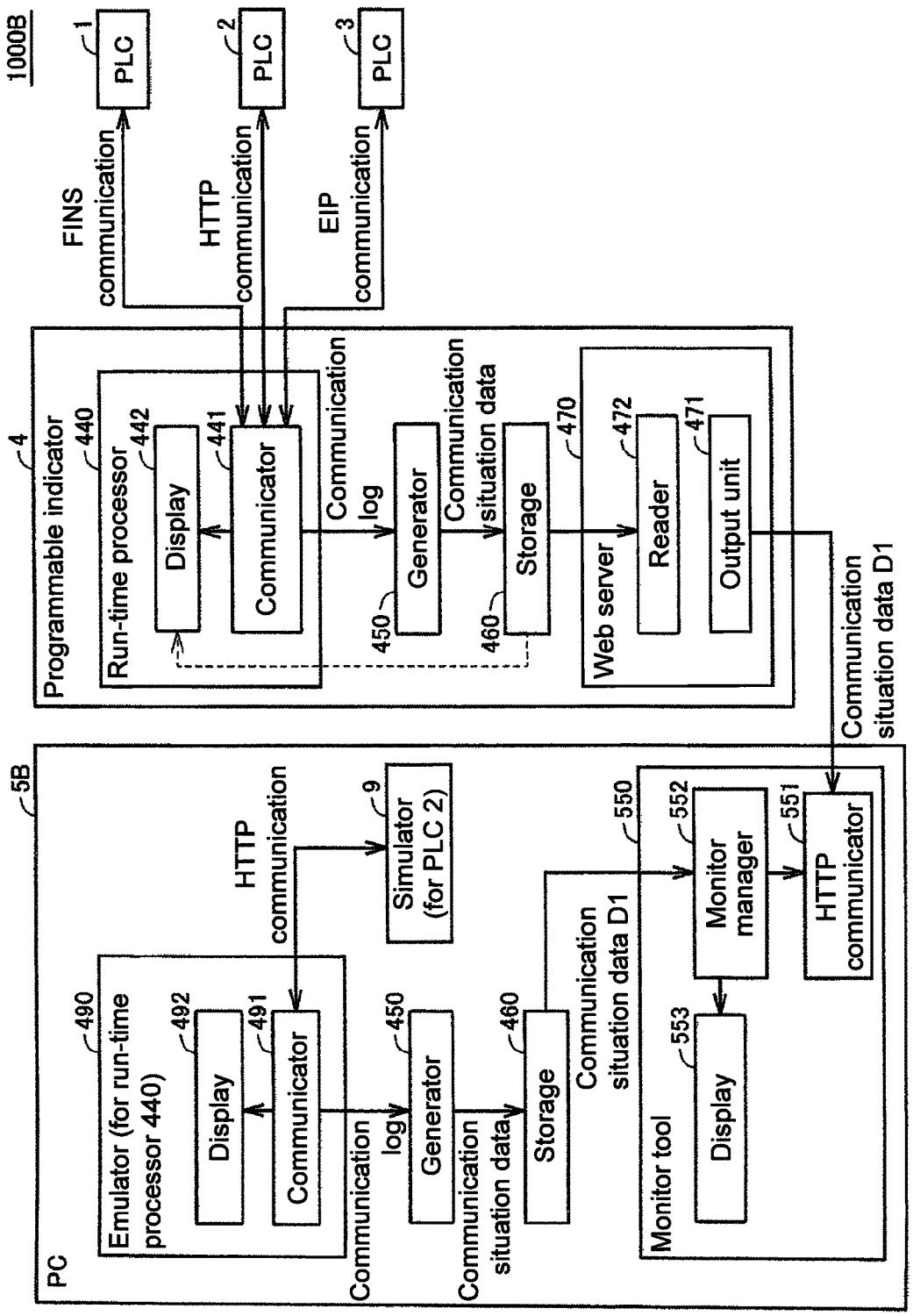
FIG. 12 is a view illustrating a configuration of a PLC system 1000B according to a third embodiment.

FIG. 12 is a view illustrating a configuration of a PLC system 1000B of the third embodiment. Referring to FIG. 12, the PLC system 1000B includes the PLCs 1 to 3, the programmable indicator 4, and a PC 5B. That is, the PLC system 1000B differs from the PLC system 1000 of the first embodiment including the PC 5 in that the PLC system 1000B includes the PC 5B. Accordingly, the PC 5B will mainly be described below.

The PC 5B includes the monitor tool 550, the emulator 490, the simulator 9, the generator 450, and the storage 460. That is, the PC 5B differs from the PC 1000A of the second embodiment including the monitor tool 550A in that the PC 5B includes the monitor tool 550.

The PC 5B having the above configuration can display the communication situation data D1, which is acquired from the programmable indicator 4 as described in the first embodiment, on the display 553. The PC 5B can display the communication situation data D1, which is generated based on the simulation and emulation as described in the second embodiment, on the display 553. Which one of the two pieces of communication situation data D1 is displayed on the display 553 by the PC 5B depends on the operation of the user.

The effect similar to that of the first and second embodiments can be obtained in the PLC system 1000B having the above configuration. That is, the user can check the latest situation of the communication with the PLCs 1 to 3 in real time. Additionally, the user can recognize the communication situations of the plurality of times in the past in terms of a specific numerical value.

Fourth Embodiment

A configuration in which a plurality of programmable indicators are connected to the PC will be described in a fourth embodiment.

Figure 13:
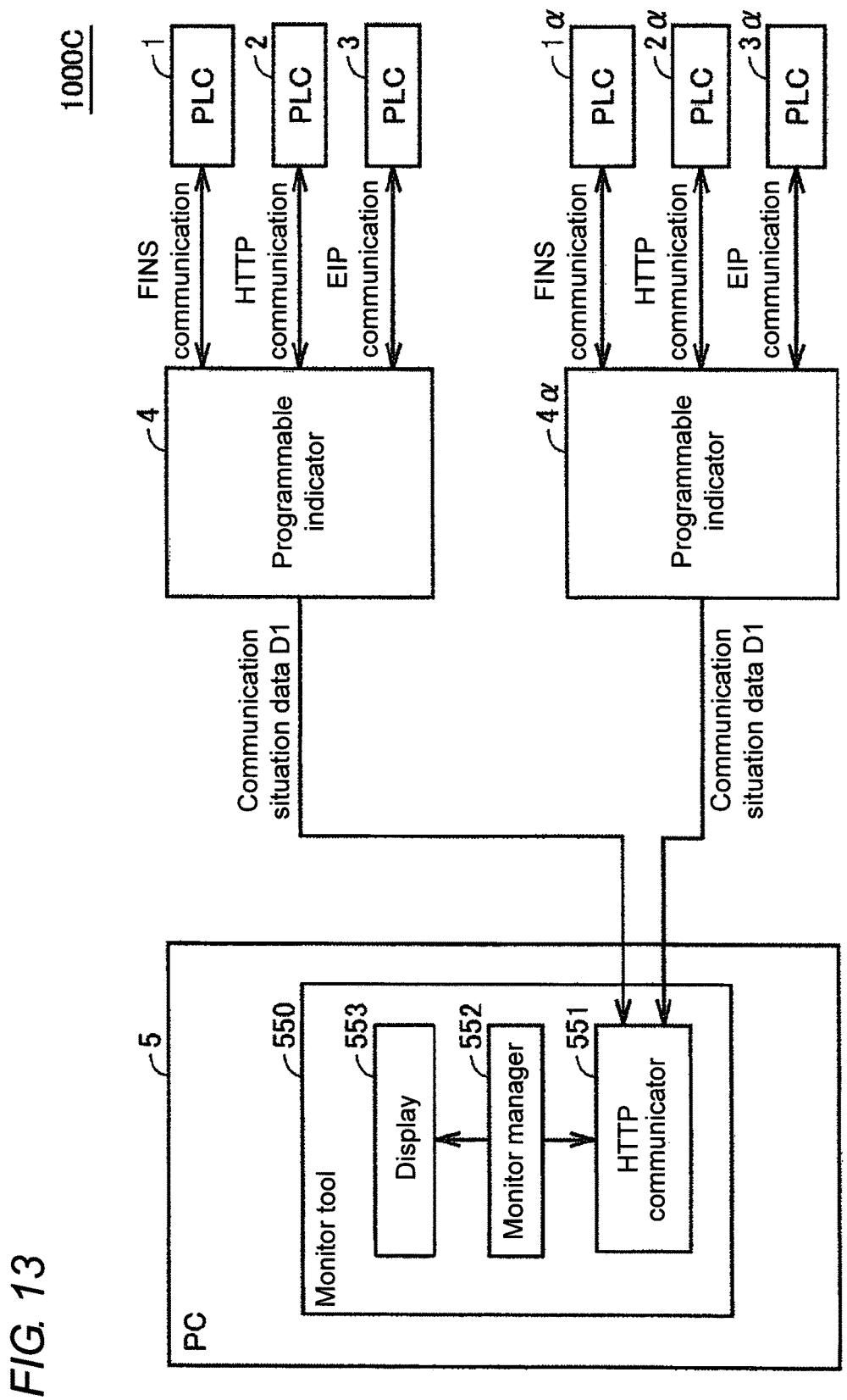
FIG. 13 is a view illustrating a configuration of a PLC system 1000C according to a fourth embodiment.

FIG. 13 is a view illustrating a configuration of a PLC system 1000C of the fourth embodiment. Referring to FIG. 13, the PLC system 1000C includes the PLCs 1 to 3, the programmable indicator 4, the PC 5, PLCs 1α, 2α, and 3α, and a programmable indicator 4α. That is, the PLC system 1000C differs from the PLC system 1000 of the first embodiment in that the PLC system 1000C includes the PLCs 1α, 2α, and 3α and the programmable indicator 4α.

The programmable indicator 4α communicates with the PLC 1α according to the FIN. The programmable indicator 4α communicates with the PLC 2α according to the HTTP. The programmable indicator 4α communicates with the PLC 3α according to the EIP. The programmable indicator 4α has the hardware and functional configurations similar to those of the programmable indicator 4. Accordingly, the description of the configuration and processing content of the programmable indicator 4α are not repeated.

In the fourth embodiment, the PC 5 is communicably connected to the programmable indicators 4 and 4α. Therefore, the HTTP communicator 551 of the PC 5 acquires the communication situation data D1 from the programmable indicators 4 and 4α.

The PC 5 causes the display 553 to display at least one of the communication situation data D1 acquired from the programmable indicator 4 and the communication situation data D1 acquired from the programmable indicator 4α. For example, in response to the operation of the user, the PC 5 displays only the communication situation data D1 acquired from the programmable indicator 4, only the communication situation data D1 acquired from the programmable indicator 4α, or both the communication situation data D1 acquired from the programmable indicator 4 and the communication situation data D1 acquired from the programmable indicator 4α.

The effect similar to that of the first, second, and third embodiments can be obtained in the PLC system 1000C having the above configuration. The user can check the pieces of communication situation data D1 from the plurality of programmable indicators using one PC.

Fifth Embodiment

In the configurations of the first, third, and fourth embodiments, the communication situation data D1 is displayed on the monitor 514 of the PCs 5 and 5B. However, the present embodiment is not limited thereto. Alternatively, the PLC systems 1000, 1000B, and 1000C may be configured such that the communication situation data D1 is displayed on the display 442 of the programmable indicator 4.

Alternatively, the communication system may be configured such that communication situation data acquired from another programmable indicator is displayed on the display 442 of the programmable indicator 4 while the communication situation data D1 is displayed on the display 442 of the programmable indicator 4. The detailed configuration will be described below.

Figure 14:
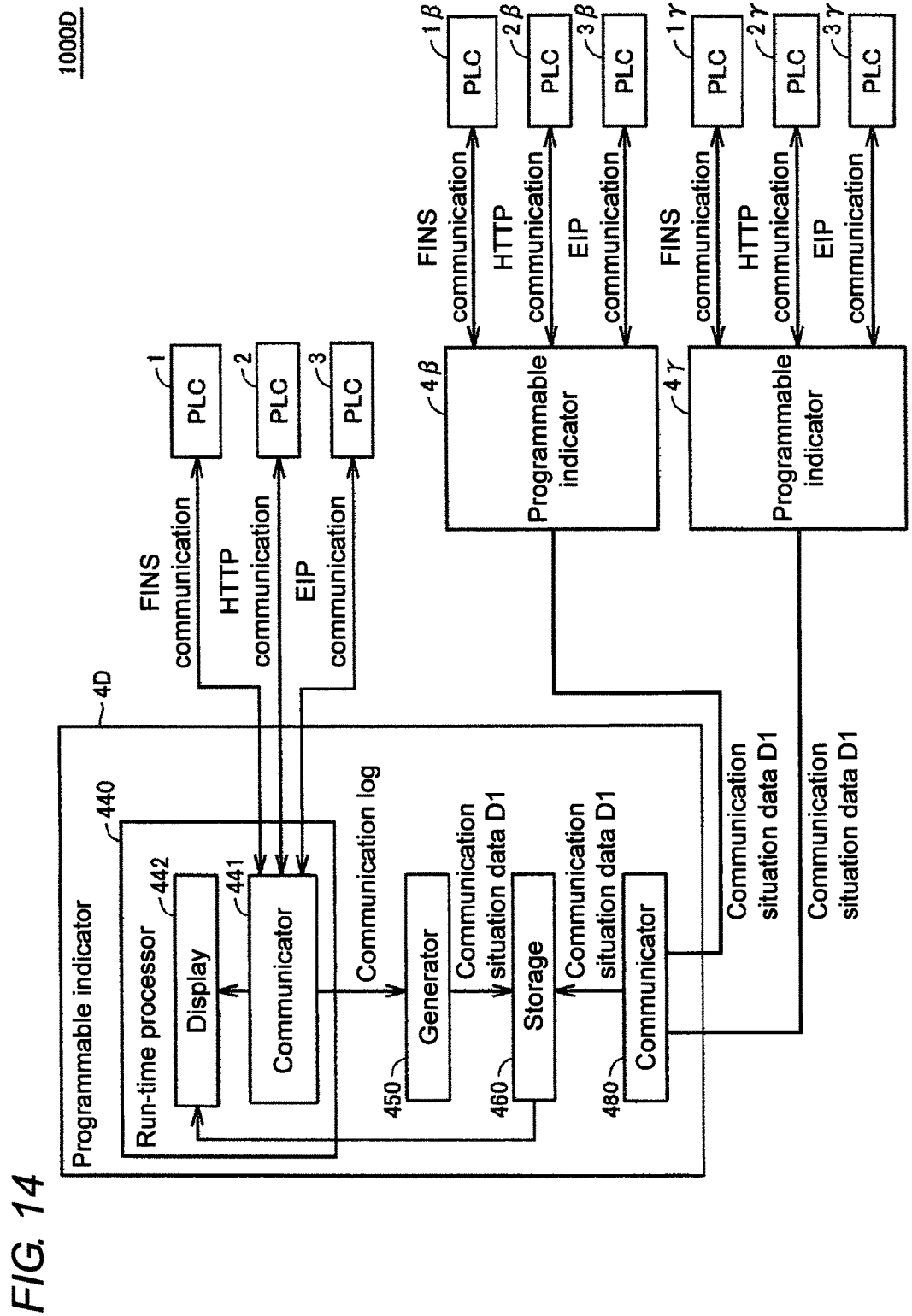
FIG. 14 is a view illustrating a configuration of a PLC system 1000D.

FIG. 14 is a view illustrating a configuration of a PLC system 1000D according to a fifth embodiment. Referring to FIG. 14, the PLC system 1000D includes the PLCs 1 to 3, the programmable indicator 4D, PLCs 1β, 2β, and 3β, a programmable indicator 4β, PLCs 1γ, 2γ, and 3γ, and a programmable indicator 4γ. That is, the PLC system 1000D differs from the PLC system 1000 of the first embodiment in that the PLC system 1000D includes the PLCs 1β, 1γ, 2β, 2γ, 3β, and 3γ and the programmable indicators 4β and 4γ while not including the PC 5.

The programmable indicator 4β communicates with the PLC 1β according to the FIN. The programmable indicator 4β communicates with the PLC 2β according to the HTTP. The programmable indicator 4β communicates with the PLC 3β according to the EIP. The programmable indicator 4γ communicates with the PLC 1γ according to the FIN. The programmable indicator 4γ communicates with the PLC 2γ according to the HTTP. The programmable indicator 4γ communicates with the PLC 3γ according to the EIP.

The programmable indicator 4D includes the run-time processor 440, the generator 450, the storage 460, and a communicator 480. That is, the programmable indicator 4D differs from the programmable indicator 4 of the first embodiment in that the programmable indicator 4D includes the communicator 480 instead of the Web server 470. The programmable indicator 4D includes the hardware configuration similar to that of the programmable indicator 4.

The programmable indicators 4β and 4γ include the hardware and functional configurations similar to those of the programmable indicator 4D.

The programmable indicator 4D communicates with the programmable indicators 4β and 4γ using the communicator 480. Specifically, the programmable indicator 4D acquires the communication situation data D1 from the programmable indicators 4β and 4γ using the communicator 480. Using the pieces of communication situation data D1 acquired from the programmable indicators 4β and 4γ, the programmable indicator 4D updates the pieces of communication situation data D1, which are stored in the storage 460 while distinguished in each indicator. For example, using the communication situation data D1 acquired from the programmable indicator 4β, the programmable indicator 4D updates the communication situation data D1 previously acquired from the programmable indicator 4β.

In the communication situation data D1 generated by the programmable indicator 4, the communication situation data D1 acquired from the programmable indicator 4β, and the communication situation data D1 acquired from the programmable indicator 4γ, the display 442 of the programmable indicator 4D displays at least one of the pieces of communication situation data D1 of the programmable indicator, designated by the user.

The effect similar to that of the first, second, and third embodiments can be obtained in the PLC system 1000D having the above configuration. Using one programmable indicator, the user can check the communication situation data D1 from at least one programmable indicator with no use of the PC.

It is noted that the disclosed embodiments are not restrictive but illustrative in every way. The scope of the present invention is indicated by not the above description but the claims, and the meanings equivalent to the claims and all the changes within the claims are included in the present invention.

The invention claimed is:

1. A programmable indicator communicable with a control device that controls a device, the programmable indicator comprising:
    a display screen;
    a communication interface communicatively coupled to the display screen; and
    a processor communicatively coupled to the display screen and the communication interface, wherein
    the processor is configured with a program to perform operations comprising:
       communicating with the communication interface to periodically acquire first data from the control device through the communication interface in a first period,
       in response to failing to acquire the first data in the first period, causing the display screen to display a first failure timing associated with the failure to acquire the first data, a name identifying the first data and a first successful timing associated with a successful acquisition of a latest first data before the failure to acquire the first data in the first period, the name identifying the first data and the first successful timing being displayed on the display screen at the first failure timing such that a latest communication situation between the programmable indicator and the control device are displayed in real time periodically acquiring second data from the control device through the communication interface in a second period, and in response to failing to acquire the second data in the second period, causing the display screen to display a second failure timing associated with the failure to acquire the second data, a name identifying the second data and a second successful timing associated with a successful acquisition of a latest second data before the failure to acquire the second data, the name identifying the second data and the second successful timing being displayed on the display screen at the second failure timing such that the latest communication situation between the programmable indicator and the control device are displayed in real time.

2. The programmable indicator according to claim 1, wherein the processor is configured with the program to perform operations comprising, when failing to acquire the first data, causing the display screen to display elapsed time between the first failure timing and the first successful timing.

3. The programmable indicator according to claim 2, wherein the first failure timing comprises a clock time at which a determination of a non-existence of a reception associated with the data acquisition is made, a reception clock time at which a fluctuation is generated beyond a predetermined permissible time of a scheduled reception clock time, or a reception clock time at which an error is detected in the received data.

4. The programmable indicator according to claim 1, wherein the processor is configured with the program to perform operations comprising causing the display screen to display time information corresponding to the first period while correlating the time information with the name identifying the first data.

5. The programmable indicator according to claim 4, wherein the time information corresponding to the first period comprises a value of the first period retained as a setting value in the processor or a time interval until next communication from a communication associated with the acquisition of the first data measured by the processor.

6. The programmable indicator according to claim 1, wherein the processor is configured with the program to perform operations comprising causing the display screen to display, when acquiring the first data, a value of the acquired first data.

7. The programmable indicator according to claim 1, wherein the failure to acquire first data comprises non-existence of reception associated with the data acquisition, a fluctuation of a reception clock time beyond predetermined permissible time of a scheduled reception clock time, or detection of an error in data acquired through the reception.

8. The programmable indicator according to claim 1, wherein the processor comprises a memory in which the program is stored and a processing unit configured to execute the program, and
the first data comprises a value of a variable used in the program.

9. The programmable indicator according to claim 8, wherein the name identifying the first data comprises a name of the variable.

10. The programmable indicator according to claim 1, wherein the first successful timing comprises a clock time at which a reception associated with the acquisition of the first data is generated, a total number of reception times corresponding to the reception, or a first data generation or transmission clock time incorporated into the first data.

11. The programmable indicator according to claim 1, wherein the first period is determined by the processor or the communication interface.

12. The programmable indicator according to claim 1, wherein the first period is determined by the control device.

13. A method for operating programmable indicator communicable with a control device that controls a device comprising:

periodically acquiring, at a control unit of the programmable indicator, first data from the control device in a first period, via a communication unit of the programmable indicator;

displaying, when the control unit fails to acquire the first data in the first period, a first failure timing associated with the failure to acquire the first data, a name identifying the first data and first successful timing on a display screen of the programmable indicator, the display screen being controlled by the control unit;

periodically acquiring, at the control unit, second data from the control device via the communication unit, and displaying, when the control unit fails to acquire the second data in a second period, a second failure timing associated with a failure to acquire the second data, a name identifying the second data and second successful timing, wherein;

the first successful timing is associated with a successful acquisition of a latest first data before the failure to acquire the first data in the first period, the name identifying the first data and the first successful timing being displayed on the display screen at the first failure timing such that a latest communication situation between the programmable indicator and the control device are displayed in real time; and the second successful timing is associated with a successful acquisition of a latest second data before the failure to acquire the second data in the second period, the name identifying the second data and the second successful timing being displayed on the display screen at the second failure timing such that a latest communication situation between the programmable indicator and the control device are displayed in real time.

14. The method according to claim 13, further comprising:

displaying, when the control unit fails to acquire the first data, elapsed time between the first failure timing and the first successful timing on the display screen.

15. The method according to claim 13, wherein
displaying, when the control unit fails to acquire the first data, the first failure timing, the name identifying the first data and the first successful timing on the display screen comprises displaying time information corresponding to the first period and correlating the time information with the name identifying the first data.

16. The method according to claim 15, wherein the time information corresponding to the first period comprises a value of the first period retained as a setting value in the control unit or a time interval until next communication since communication associated with the acquisition of the first data measured by the control unit.

17. The method according to claim 13, further comprising:
 displaying, when acquiring the first data, a value of the acquired first data on the display screen.

18. The method according to claim 13, wherein failure to acquire the first data comprises non-existence of reception associated with the data acquisition, a fluctuation of a reception clock time beyond predetermined permissible time of a scheduled reception clock time, or detection on an error in data acquired through the reception.

* * * * *